Dec. 17, 1935.   A. SIMON   2,024,542

TIMING DEVICE

Filed Aug. 26, 1933

Inventor
Arthur Simon
By Paul M Hubbard
Attorney

Patented Dec. 17, 1935

2,024,542

UNITED STATES PATENT OFFICE 2,024,542

TIMING DEVICE

Arthur Simon, Milwaukee, Wis., assignor to Cutler-Hammer, Inc., Milwaukee, Wis., a corporation of Delaware Application August 26, 1933, Serial No. 686,929

11 Claims. (Cl. 219—4)

This invention relates to electric timing devices and is especially applicable to electric welders, though not limited thereto.

In the United States patents of James D. Le Van, et al., 1,867,225, and of Stansbury, et al., 1,892,017, are described systems in which current is applied to a translating device for an adjustable time, the time being controlled through an electron tube, the discharge of which is affected by the energy stored in an energy storage circuit connected to the tube so as to modify its discharge characteristic. The system illustrated in the aforementioned patents and other systems proposed heretofore for similar purposes cause the phenomena to be controlled to have a constant time interval for each cycle of operation. Under certain conditions, particularly with electric welding equipments, it is desirable to modify the time interval during which the desired phenomenon takes place in accordance with certain variations in operating conditions.

In case of an electric spot welder, for instance, the resistance to the current flow through the weld upon the initial establishment of the welding circuit varies in accordance with the pressure exerted on the spot to be welded and the surface conditions of the material as well as the surface conditions of the welding jaws. If, at the moment of closure of the welding circuit, the resistance at the weld, and hence of the circuit, is high, the initial current flowing is low and the total energy which is supplied to the weld during a fixed time interval is insufficient to produce adequate heating of the metal which results in an unsound weld. To remedy the condition it is necessary to increase the time of current application if the resistance of the welding circuit is relatively high and to decrease the time of application if the welding circuit resistance is abnormally low.

The present invention has for its object to provide a controller in which the time during which current is supplied to the weld is an interval which is modified in accordance with the amount of energy flowing through the weld during the welding period.

Another object is to provide a controller which assures the supply of a substantially constant amount of heating energy to the weld irrespective of the surface conditions of the weld.

Other objects and advantages will hereinafter appear.

The accompanying drawing illustrates one embodiment of my invention, wherein—

Figure 1:
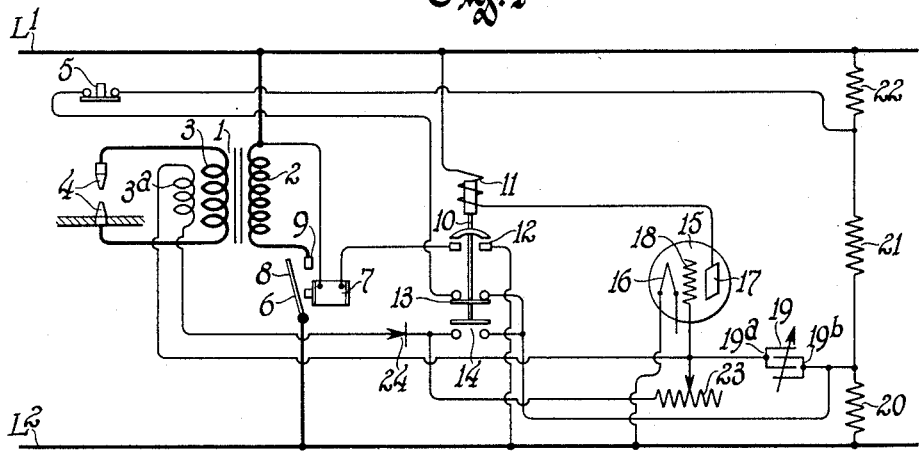
Figure 1 is a diagrammatic showing of an electric welding system.

Referring to Fig. 1, lines L¹ and L² are the terminals of an alternating current supply. 1 indicates a welding transformer having a primary winding 2, a main secondary winding 3, and an auxiliary secondary winding 3ª. The winding 3 is connected to the jaws 4 of the welding machine. Adjacent to the welder is a normally closed push button switch 5. A magnet switch 6 is provided with a winding 7 and normally open cooperating contacts 8 and 9 which are connected in series with the winding 2 across the supply lines L¹ and L². A relay 10 is provided with a magnet winding 11, normally closed main contacts 12, normally open auxiliary contacts 13 and normally closed auxiliary contacts 14. The system further includes an electron tube 15 preferably of the gaseous type having a cathode 16 which may be heated in any well known manner (not shown), an anode 17 and a control grid 18. The winding 7 of switch 6 has one of its terminals connected to the line L¹ while its other terminal is normally connected through the contact 12 to the line L². Winding 11 of relay 10 is connected between the line L¹ and the anode 17, the cathode 16 being connected to line L². An adjustable condenser 19 has one of its plates 19ª connected to the grid 18, while the other plate 19ᵇ is connected through the resistance 20 to line L² and the resistances 21 and 22 to line L¹. An adjustable resistance 23 may be connected across the plates of the condenser through contacts 14 of the relay 10. The winding 3ª is connected across the resistance 23 in series with a rectifier 24, which may be of any well known type. One contact of push button switch 5 is connected to the common terminal of resistances 21 and 22, while the other contact of said push button switch is connected through the normally open contact 13 of relay 10 to the condenser plate 19ᵇ.

The system operates in the following manner: When it is desired to make a weld the material to be welded is introduced between the jaws 4 and the latter are pressed together. A current normally flows from line L¹ through winding 11 of relay 10, through the tube 15 to the line L² during every positive half cycle of the alternating current.

Prior to the welding operation the grid 18 of tube 15 is of such potential as not to impede current flow during the positive half cycle of the alternating current, because the voltage drop through the resistance 20 tends to make the grid positive with respect to the cathode so that the negative potential of the former is not sufficient to prevent the discharge of the tube during the positive half cycle. A current, therefore, flows through the winding 11 which causes opening of the contacts 12 so that no current flows through the coil 7 of switch 6 and the primary winding of the transformer does not receive any current from the line.

If the operator now wishes to apply current to the weld, he pushes push button switch 5 thereby opening the circuit from the junction of resistances 21 and 22, through push button switch 5, contacts 13 to condenser plate 19ᵇ, thus inserting resistance 21 in series with resistances 22 and 20. This causes a sudden reduction of the potential of condenser plate 19ᵇ and a corresponding drop of the potential of condenser plate 19ᵃ to a negative value which is sufficient to prevent re-starting of discharge through the tube on the succeeding positive half cycle, and therefore contacts 12 of relay 10 are closed and switch 6 is energized. This, in turn, completes the circuit for the current supply of the welding transformer 1 and the welding jaws receive current. When the relay 10 is deenergized, the contacts 13 are opened and the contacts 14 are closed. The condenser now tends to discharge from plate 19ᵇ through contacts 14 and resistance 23 to condenser plate 19ᵃ. This discharge continues until the critical grid voltage is attained, whereupon the tube again becomes conducting.

Figure 2:
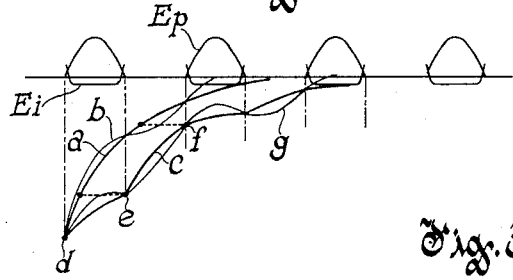
Fig. 2 shows the voltage relations of the system illustrated in Fig. 1.

Without the rectifier 24 and the transformer winding 3ᵃ, the potential between the condenser plates would vary in accordance with the curve a of Fig. 2. Due to the drop in voltage through the resistance 20, the resulting grid potential with respect to the cathode varies then in accordance with curve b, as is fully described in the aforementioned Patent 1,892,017. The transformer winding 3ᵃ and the rectifier 24, however, are connected so that current from the former can only flow during the positive half cycle of the line voltage, so as to produce a potential across the resistance 23 which is added to the potential drop due to the condenser 19. The discharge of the condenser, therefore, takes place at a reduced rate as shown by section d—e of the curve c of Fig. 2. During the succeeding negative half cycle only the voltage of the condenser 19 is impressed upon the resistance 23 and therefore the condenser discharges in accordance with the section e—f which is parallel to the curve a, as indicated. During the next succeeding half cycle, the voltage of the transformer is again opposed to the voltage of the condenser and so on, the condenser gradually becoming completely discharged. The effective grid potential is again the resultant of the condenser potential and the drop in resistance 20, as indicated by curve g. Ultimately the grid attains the critical potential and the tube becomes conducting.

The welding transformer is designed with a "drooping" characteristic, that is, the voltage induced in winding 3 and also in winding 3ᵃ increases with decreasing current, the winding 3ᵃ being placed so that its voltage is proportional to that of winding 3. Therefore, the higher the welding current, the smaller is the additional delay of the condenser discharge due to the opposition of the welding voltage and vice versa.

Figure 3:
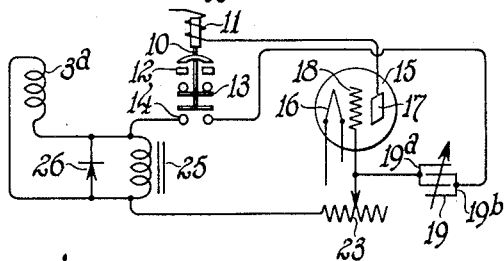
Figs. 3 and 4 illustrate modifications of the system as per Fig. 1.

Instead of applying the voltage of the transformer 3ᵃ in the manner indicated in Fig. 1, it may also be applied as indicated in Fig. 3, wherein the transformer winding 3ᵃ supplies an impedance 25 connected in series with the discharge circuit and paralleled by a rectifier 26 so that during the positive half cycle of the alternating current the voltage connected in series with the discharge circuit of condenser 19 is opposed to said condenser voltage, while during the negative half cycle such opposing voltage is a minimum because the condenser can directly discharge through the rectifier 26 which has a minimum impedance in that direction.

Figure 4:
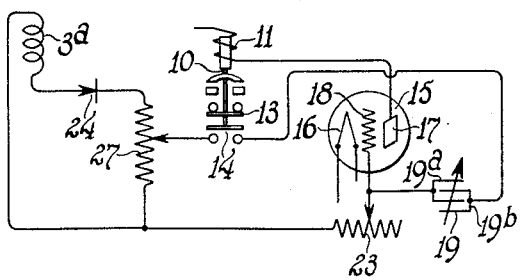

In the modification, Fig. 4, the voltage of the coil 3ᵃ during the positive half cycle is impressed upon a potentiometer resistance 27 by means of which an adjustable fraction of said voltage may be impressed upon the discharge circuit of the condenser 19 in opposition to the voltage of the latter and thus the discharge time is controlled as aforedescribed.

Instead of determining the value of the welding current by means of the transformer winding 3ᵃ, it is possible to use a series connected transformer or coil, in series with the transformer winding 3 in a well known manner.

Since, as aforementioned, there is a definite relation between the current of a welding transformer and the voltage, it is also possible to connect the control circuit across the welding jaws and use the voltage therebetween as a measure of the welding current as will be obvious to one skilled in the art. Furthermore, instead of connecting the condenser discharge circuit and the means for modifying the discharge period of said circuit to the control electrode of the tube, it is obvious that they may be connected into the main discharge circuit thereof so as to modify the effective voltage in the main discharge circuit, since it is well known that the initiation of discharge of the tube may also be controlled by controlling the voltage impressed between the cathode and anode.

What I claim as new and desire to secure by Letters Patent is:

1. In combination, a power supply, a translating device supplied thereby, an electron tube controlling the continuity of circuit thereof, means to effect completion of the circuit of said translating device, means comprising energy storing and discharging means associated with said tube and having a transient effect thereon to cause said former means to function intermittently and further comprising means to render the periods of such functioning controllable in respect of duration by the energy supplied to said translating device.

2. In combination, a power supply, a translating device supplied thereby, an electron tube controlling the continuity of circuit thereof, means to effect the completion of circuit of said translating device, energy storing and discharging means associated with said tube and having a transient effect thereon to cause said former means to function intermittently and means responsive to the energy supplied to said translating device to vary the duration of said transient effect.

3. In combination, a power supply, a translating device supplied thereby, an electron tube controlling the continuity of circuit thereof, means to impress upon said tube a potential to effect commutation of the circuit of said translating device and means comprising energy storing and discharging means associated with said tube to function intermittently and having a transient effect thereon for a time interval and further comprising means to render such time interval controllable in respect of duration by the energy in said circuit.

4. In an electric welding system adapted to supply to the material to be welded an adjustable amount of energy, in combination, a power supply, a pair of welding jaws receiving energy from said supply, an electron tube controlling the continuity of circuit thereof, means to impress upon said tube a potential for varying the conductivity of said tube to effect commutation of circuit to said jaws and means comprising energy storing and discharging means associated with said tube and having a transient effect thereon to cause said tube to effect completion of the circuit to said jaws for a time interval and further comprising means to vary such time interval in response to the energy supplied to said jaws.

5. In an electric welding system adapted to supply to the material to be welded an adjustable amount of energy, in combination, a power supply, a pair of welding jaws receiving energy from said supply, an electron tube controlling the duration of continuity of circuit thereof, means comprising energy storing and discharging means associated with said tube and having a transient effect thereon to cause said tube to maintain the circuit to said jaws for a time interval and further comprising means to vary such time interval in response to the energy supplied to said jaws and to impress upon said tube a potential for rendering it conducting to effect interruption of circuit to said jaws.

6. In an electric welding system adapted to supply to the material to be welded an adjustable amount of energy, in combination, a power supply, a pair of welding jaws receiving energy from said supply, an electron tube controlling the continuity of circuit thereof, energy storing and discharging means associated with said tube and having a transient effect thereon to commutate the circuit to said jaws and means to vary the duration of said transient effect in accordance with the energy supplied to said jaws.

7. In an electric welding system adapted to supply to the material to be welded an adjustable amount of energy, in combination, a power supply, a pair of welding jaws receiving energy from said supply, an electron tube controlling the continuity of circuit thereof, energy storing and discharging means associated with said tube and having transient effect thereon to commutate the circuit to said jaws and means connected to said jaws and said discharging means to vary the duration of said transient effect in accordance with the energy supplied to said jaws.

8. In an electric welding system adapted to supply current to the material to be welded for an adjustable time, in combination, a power supply, a pair of welding jaws receiving energy from said supply, an electron tube controlling the continuity of circuit thereof and having a control electrode, means to impress upon said electrode a potential for varying the conductivity of said tube to effect commutation of the circuit to said jaws, means comprising energy storing and discharging means associated with said electrode and having a transient effect thereon to cause said tube to effect completion of the circuit to said jaws for a period of time and further comprising means to vary such period in response to said energy, and means associated with said first mentioned means to complete a circuit to effect discharge of said storing means upon completion of the circuit to said jaws.

9. In an electric welding system adapted to supply current to the material to be welded for an adjustable time, in combination, a power supply, a pair of welding jaws receiving energy from said supply, an electron tube controlling the continuity of circuit thereof and having a control electrode, means to impress upon said electrode a potential rendering said tube conductive to effect interruption of circuit to said jaws, means comprising energy storing and discharging means associated with said electrode and having a transient effect thereon to cause said tube to effect completion of circuit to said jaws for a period of time and further comprising means to vary said time interval in response to said energy and means associated with said first mentioned means to complete a circuit to effect discharge of said storing means upon completion of the circuit to said jaws.

10. In an electric welding system adapted to supply current to the material to be welded for an adjustable time, in combination, an alternating current supply, a pair of welding jaws receiving energy therefrom, an electron tube controlling the continuity of circuit thereof and having a control electrode, means to impress upon said electrode a potential derived from said supply for rendering said tube conductive to effect interruption of circuit to said jaws, means comprising energy storing and discharging means associated with said electrode and having a transient effect thereon to cause said tube to effect completion of the circuit to said jaws for an interval of time and further comprising means to vary said time interval in response to said energy, said first mentioned means including means to superpose an alternating potential which is in phase with the potential of said alternating circuit upon the control electrode during said interval.

11. In an electric welding system adapted to supply current to the material to be welded for an adjustable time, in combination, an alternating current supply, a pair of welding jaws receiving energy from said supply, an electron tube controlling the continuity of circuit thereof and having a control electrode, means to impress upon said electrode a potential rendering said tube conductive to effect interruption of circuit to said jaws, means comprising energy storing and discharging means associated with said electrode and having a transient effect thereon to cause said tube to effect completion of circuit to said jaws for an interval of time and further comprising means to vary said time interval in response to said energy, means to commutate the connection of said energy storing means, means associated with said energy storing and discharging means to complete a circuit to effect discharge of said storing means upon initiation of said energy supply to said jaws, said first mentioned means including means to superpose an alternating potential which is in phase with the potential of said alternating supply upon the control electrode during said given period.

ARTHUR SIMON.